(12) United States Patent
Vanttila

(10) Patent No.: US 6,173,194 B1
(45) Date of Patent: Jan. 9, 2001

(54) MOBILE TERMINAL HAVING IMPROVED USER INTERFACE

(75) Inventor: Jaakko Vanttila, Oulu (FI)

(73) Assignee: Nokia Mobile Phones Limited, Salo (FI)

( * ) Notice: Under 35 U.S.C. 154(b), the term of this patent shall be extended for 0 days.

(21) Appl. No.: 08/632,268

(22) Filed: Apr. 15, 1996

(51) Int. Cl.[7] .................................................. H04B 1/38
(52) U.S. Cl. ............................ 455/566; 455/90; 455/575; 379/433
(58) Field of Search ............................ 455/403, 564, 455/566, 550, 575, 90; 379/428, 433, 368; D14/138, 140, 148; 200/2 A

(56) References Cited

U.S. PATENT DOCUMENTS

| | | | |
|---|---|---|---|
| 3,005,055 | * 10/1961 | Mattke | 200/6 A |
| 5,016,002 | 5/1991 | Levanto | 340/756 |
| 5,266,949 | 11/1993 | Rossi | 341/22 |
| 5,359,651 | 10/1994 | Draganoff | 379/354 |
| 5,408,060 | 4/1995 | Muurinen | 200/314 |
| 5,422,656 | * 6/1995 | Allard et al. | 455/566 |
| 5,436,954 | * 7/1995 | Nishiyama et al. | 379/428 |
| 5,465,401 | * 11/1995 | Thompson | 455/564 |
| 5,508,978 | * 4/1996 | Kalbermatter et al. | 379/428 |
| 5,633,912 | * 5/1997 | Tsoi | 455/566 |
| 5,677,949 | * 10/1997 | Macor | 379/433 |
| 5,715,524 | * 2/1998 | Jambhekar et al. | 455/566 |

FOREIGN PATENT DOCUMENTS 0 463 856 A2  2/1992  (EP).

* cited by examiner

Primary Examiner—Nay Maung
(74) Attorney, Agent, or Firm—Ohlandt, Greeley, Ruggiero & Perle, LLP

(57) ABSTRACT

A cellular telephone (10) has a user interface (5) that includes an actuator (23) for inputting information to the telephone. The actuator extends from a surface of the telephone and has multiple degrees of freedom for selecting at least individual ones of numeric digits 0 through 9. Indicia representing individual ones of the numeric digits 0 through 9 in addition to the characters * and # may be arrayed about the actuator, and may correspond to a clock face, wherein the indicia "1" corresponds to the 1:00 position, and wherein one of the indicia "*" and "#" corresponds to the 12:00 position. Alternatively, digits may be displayed to the user in an n by m matrix format. Further in accordance with this invention the user interface also includes a display (20) disposed on the surface. The display is capable of displaying characters with a non-perpendicular orientation (e.g., a diagonal orientation) relative to a longitudinal axis of the telephone, and enables the display size to be increased relative to a conventional LCD character display orientation. The display may also be windowed.

27 Claims, 5 Drawing Sheets

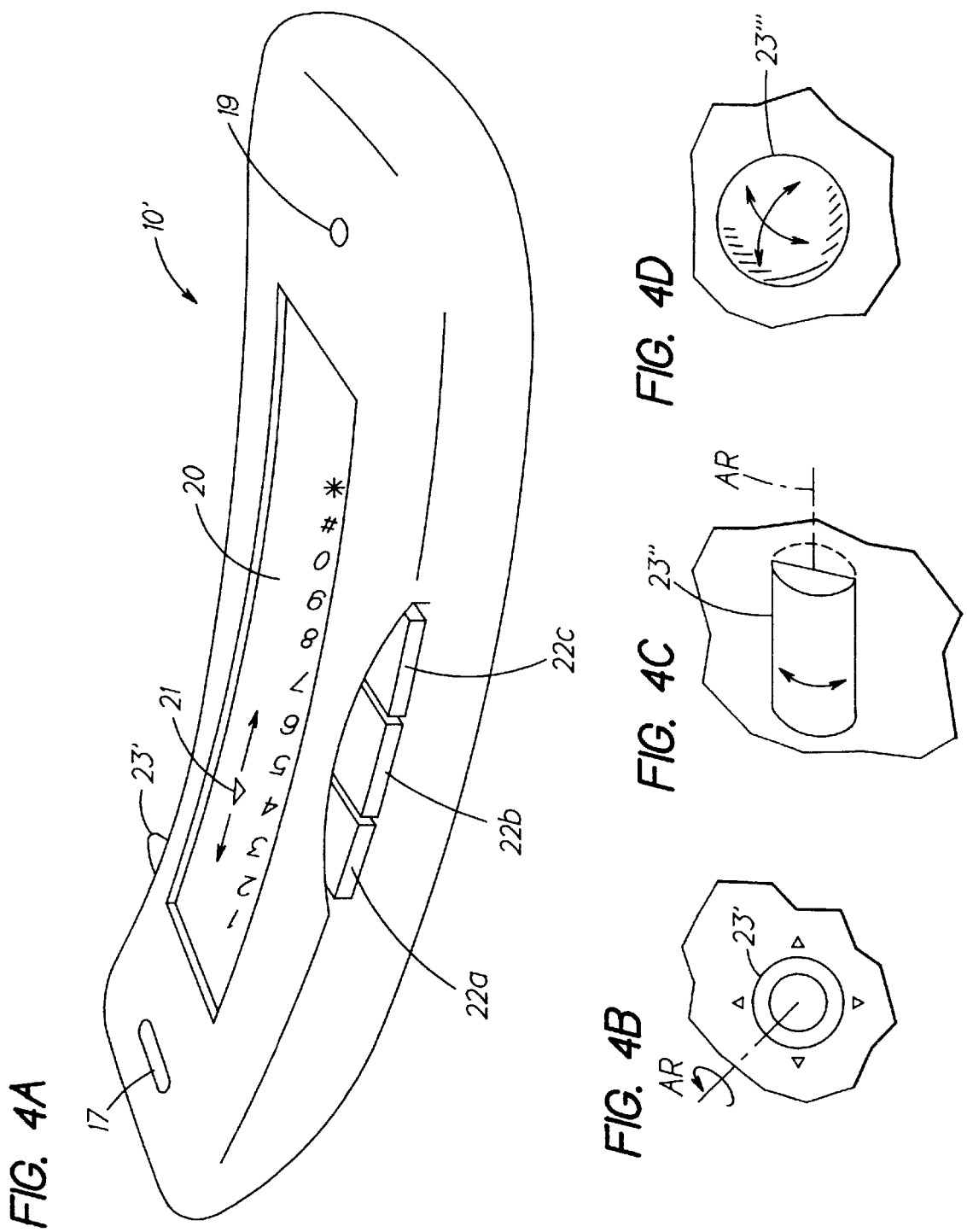

MOBILE TERMINAL HAVING IMPROVED USER INTERFACE

FIELD OF THE INVENTION

This invention relates generally to radiotelephones and, in particular, to mobile terminals, such as cellular telephones, that include a user interface having a user information entry device and a display.

BACKGROUND OF THE INVENTION

Conventional mobile terminals, such as cellular telephones, have a multi-key keypad whereby the user is enabled to enter a phone number to be dialed. Many modern cellular telephones also include a display, normally a low power liquid crystal display (LCD), whereby information is displayed to the user. This information can include numbers, names, messages, menu functions, settings, and other application information (e.g., timers, etc.) realting to various operating parameters of the telephone. In this case the keypad can also be used for interacting with the display for selecting various ones of the menus and for entering data required by particular menu and other functions.

In all such devices an important aspect of the terminal's operation is the ease of use of the user interface (e.g., the size and accessibility of the keypad keys) and the size and readability of the displayed information. These considerations become especially important for those with impaired sight. However, the trend in designing such handheld communications equipment is to make the devices smaller and less obtrusive when carried by the user.

Since the user interface is a portion of the terminal that the average user interacts with on a regular basis, and may be the most familiar with, it is important that the user interface be seen as being as "user friendly" as possible, without, however, sacrificing the required functionality.

OBJECTS OF THE INVENTION

It is thus a first object of this invention to provide an improved user interface for a mobile terminal.

It is a second object of this invention to provide a user interface for a handheld communications device that does not require a conventional multi-key keypad for entering information, such as a telephone number to be dialed.

It is a further object of this invention to provide a user interface for a handheld communications device that has a display capable of displaying information with a character size and orientation that enables an increase in a total amount of displayable information.

SUMMARY OF THE INVENTION

The foregoing and other problems are overcome and the objects of the invention are realized by methods and apparatus in accordance with embodiments of this invention.

In accordance with one aspect of this invention a cellular telephone has a user interface comprised of an actuator for inputting information to the telephone. The actuator extends from a surface of the telephone and has multiple degrees of freedom for selecting at least individual ones of numeric digits 0 through 9, in addition to the characters * and #. Indicia representing individual ones of the numeric digits 0 through 9 in addition to the characters * and # are arrayed about the actuator, and preferably correspond to a clock face, wherein the indicia "1" corresponds to the 1:00 position, and wherein one of the indicia "*" and "#" corresponds to the 12:00 position.

In accordance with another aspect of this invention a cellular telephone has a user interface comprised of an actuator for inputting information to the telephone. The actuator extends from a surface of the telephone and has an axis of rotation about which the actuator is manipulated by a user for selecting at least individual ones of numeric digits 0 through 9, in addition to the characters * and #. Indicia representing individual ones of the numeric digits 0 through 9 in addition to the characters * and # are displayed to the user on a display, such as an LCD display, and manipulation of the actuator is used for positioning a cursor or other indicator for selecting individual ones of the displayed numeric digits and other characters. The displayed numeric digits and other characters can be arranged in a column, or arranged in an n by m matrix, such as a 4 by 3 matrix.

The actuator may have a further degree of freedom that is perpendicular to the surface for actuating a switch when depressed. By example, a depression of the actuator results in the initiation of a placement of a telephone call to a telephone number previously entered into the cellular telephone, and/or can be used for selecting a currently indicated numeric digit or other character.

In a preferred embodiment the actuator is disposed on a front or side surface of the cellular telephone. The cellular telephone may further include at least one user-depressible switch disposed on a side surface. This at least one user-depressible switch may be used as a menu function "softkey" select switch.

Further in accordance with an aspect of this invention the user interface also comprises a display disposed on the surface. The display is capable of displaying characters with a non-perpendicular orientation (e.g., a diagonal orientation) relative to a longitudinal axis of the telephone.

In accordance with one method of this invention, in particular a method of dialing a telephone number with a radiotelephone, the following steps are executed: (a) manipulating a multiple degree of freedom actuator so as to select individual ones of indicia 0–9; and (b) storing numbers associated with selected ones of the indicia as individual numbers of a telephone number.

BRIEF DESCRIPTION OF THE DRAWINGS

The above set forth and other features of the invention are made more apparent in the ensuing Detailed Description of the Invention when read in conjunction with the attached Drawings, wherein:

FIG. 4A is an elevational view of cellular telephone in accordance with an embodiment of this invention;

FIG. 4B illustrates in greater detail an actuator that forms a portion of the cellular telephone illustrated in FIG. 4A;

FIG. 4C illustrates a second embodiment of an actuator that may form a portion of the cellular telephone illustrated in FIG. 4A;

FIG. 4D illustrates a third embodiment of an actuator that may form a portion of the cellular telephone illustrated in FIG. 4A;

DETAILED DESCRIPTION OF THE INVENTION

Figure 1A:
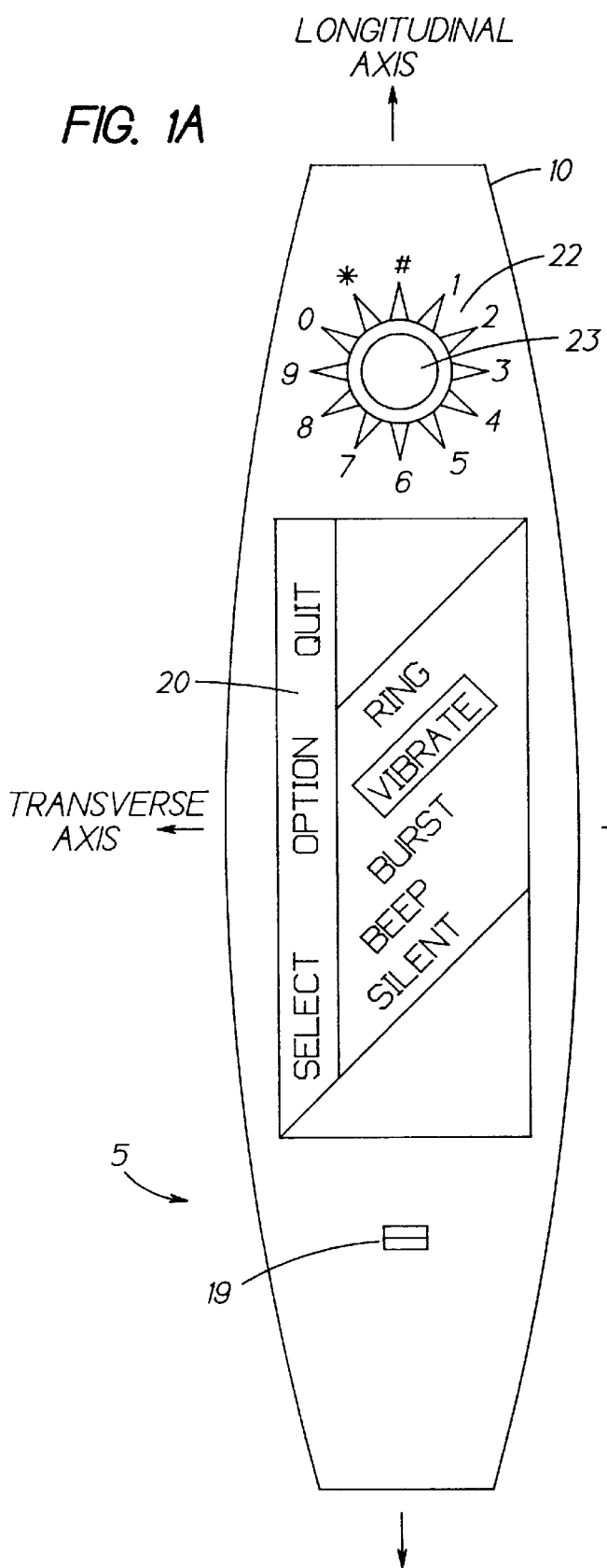
FIG. 1A is a front view, and FIG. 1B a side view, of a cellular telephone constructed to have a user interface in accordance with this invention.
Figure 1B:
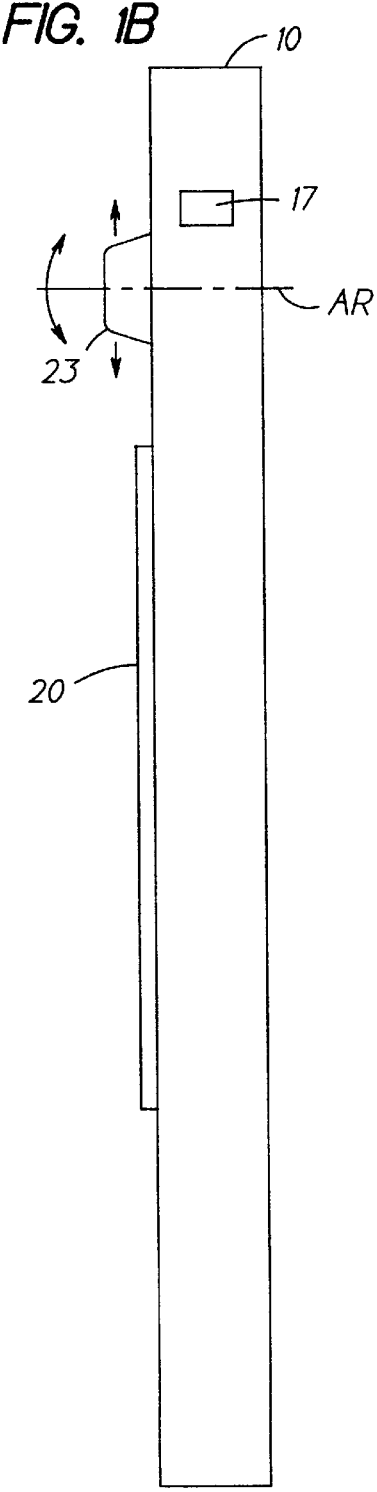

FIG. 1A illustrates a front view, and FIG. 1B a side view, of a handheld communications device, also referred to herein as a personal communicator or mobile terminal 10. By example, the mobile terminal 10 may be or may include a cellular telephone.

The mobile terminal 10 has a generally elongated shape having a longitudinal dimension that is several times that of a transverse dimension. A microphone 19 may be positioned such that it is near to a user's mouth when making a telephone call. A speaker 17 can be appropriately positioned on the front surface, or on a side surface as shown in FIG. 1B.

In accordance with a first embodiment of this invention the mobile terminal 10 includes a user interface 5 comprised of a data entry device 22 having a multi-position actuator 23 surrounded by indicia representing the digits 1–9 and 0, and also the conventional * and # telephone keys. The actuator 23 is similar in some respects to a conventional "joystick", and has at least 12 degrees of freedom or movement in a plane parallel to the front surface of the mobile terminal 10. To select a specific digit the user employs a finger to push the actuator towards the desired digit (or towards the * or # positions). Referring also to FIG. 3B, pushing the actuator 23 towards a specific digit indicia results in a switch contact (a physical or logical switch contact) being closed (Switches SW1–SW12), thereby indicating to the mobile terminal 10 which of the twelve possible indicia was selected. In this manner the user is enabled to dial a telephone number, or to enter other information as required. By example, the "2" digit position may also be associated with the characters "A, B, C", the "3" digit position with the characters "D, E, F", etc., as on a conventional telephone keypad. The twelve indicia are preferably arranged so as to correspond to a 12 hour clock face, with the "1" in the 1:00 position, the "2" in the 2:00 position, etc. One of the indicia "*" and "#" corresponds to the 12:00 position.

The actuator 23 is preferably spring-loaded so that it always returns to the central (vertical) position. The actuator 23 may be coupled to suitable movement transducers, such as potentiometers, so that its movement can be correlated with a particular one of the surrounding indicia. In this case the switches SW1–SW12 shown in FIG. 3B can be considered as logical switches which are "closed" after detecting that the actuator 23 was manipulated so as lean or point in the direction of the corresponding indicia.

It is also within the scope of this invention to provide for a vertical travel of the actuator 23 (as shown in FIG. 3B) for closing a further switch. By example only, this further switch may be associated with the conventional cellular telephone "SEND" push button. In this manner the user manipulates the actuator 23 in the plane parallel to the front face of the mobile terminal 10 for selecting a telephone number to be dialed, and then depresses the actuator 23 for generating the SEND signal, which causes the dialed number to be transmitted to the base station.

The actuator 23 can also be considered to have an axis of rotation (AR) about which at least limited movement is possible by user manipulation of the actuator.

The user interface 5 further includes the LCD 20. In accordance with an aspect of this invention the LCD 20 can be operated so as to display characters in a diagonal fashion, as opposed to the conventional manner wherein lines of displayed characters are perpendicular to the longitudinal axis of the mobile terminal. The LCD 20 can be operated so as to display lines of characters so that they are parallel to the longitudinal axis of the mobile terminal. In this manner the size of the displayed characters may be increased or decreased, and displayed lines of characters made longer, thereby increasing the readability of the displayed information, without requiring a corresponding increase in the display surface area. The character size and orientation is preferably varied with software that is used to drive the LCD display 20. The LCD can be driven so as to display diagonal lines of characters such that the diagonal rises from left to right, or such that the diagonal rises from right to left.

Figure 2A:
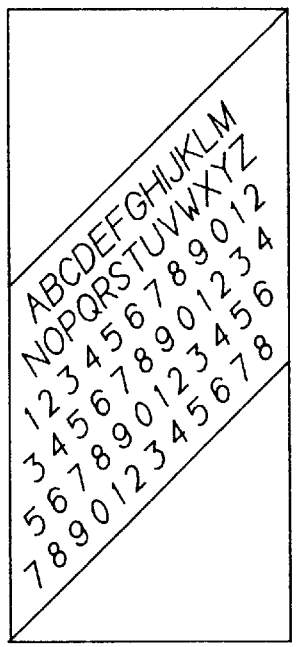
FIGS. 2A–2D illustrate a diagonally operated LCD display that is a feature of the user interface that is constructed and operated in accordance with this invention.
Figure 2B:
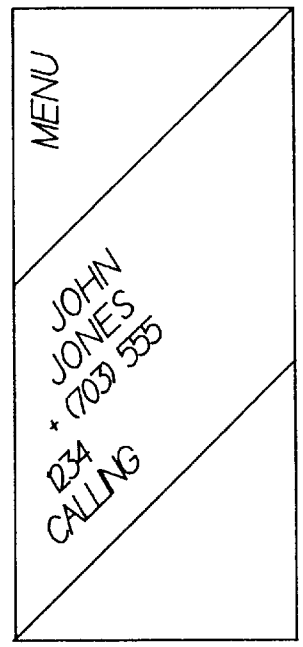
Figure 2C:
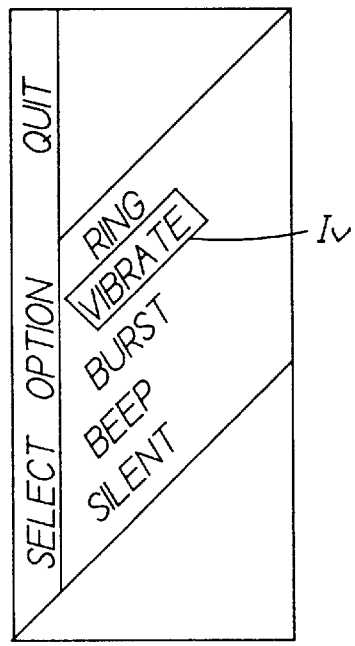
Figure 2D:
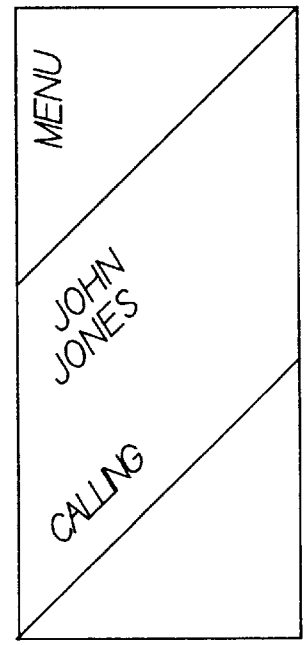

FIGS. 2A–2D illustrate various displayed information in accordance with this invention. FIG. 2A illustrates a text message mode, without softkey labels, using 6×12 characters. FIG. 2B illustrates a "normal mode" with one softkey label (i.e., Menu corresponding to key 22a in FIG. 3A) and 5×10 characters. FIG. 2C illustrates the "menu" mode with three softkeys (corresponding to keys 22a–22c of FIG. 3A) and 5×8 characters, wherein one diagonally displayed line is shown in an "inverse video" (IV, i.e., white on black) format. In general, a selected function can be shown in the inverse video mode. FIG. 2D illustrates a "full screen mode" with one softkey label and 4×9 characters. Each of these various modes is implemented by appropriately programming the LCD to have a desired character size and orientation. A dedicated LCD controller can be used, or the LCD programmed directly from the controller 18 of FIG. 3A.

The character sizes can be varied during the operation of the mobile terminal 10, and also certain displayed information can be displayed with various other (non-diagonal) orientations, such as the "Menu" softkey indicator in FIGS. 2B and 2D, and the "Select", "Option" and "Quit" softkey indicators in FIG. 2C. Furthermore, and if desired, certain characters can be displayed with a conventional orientation (i.e., perpendicular to the longitudinal axis of the mobile terminal 10).

Figure 6A:
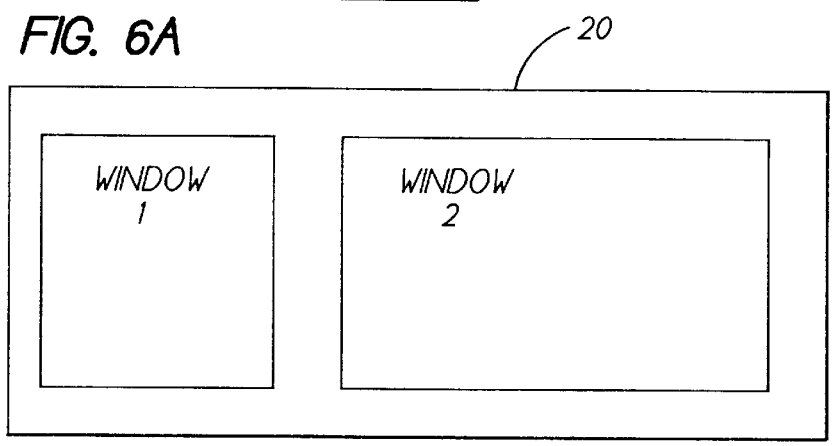
FIGS. 6A–6C illustrate various textual orientations in a windowed cellular telephone display.
Figure 6B:
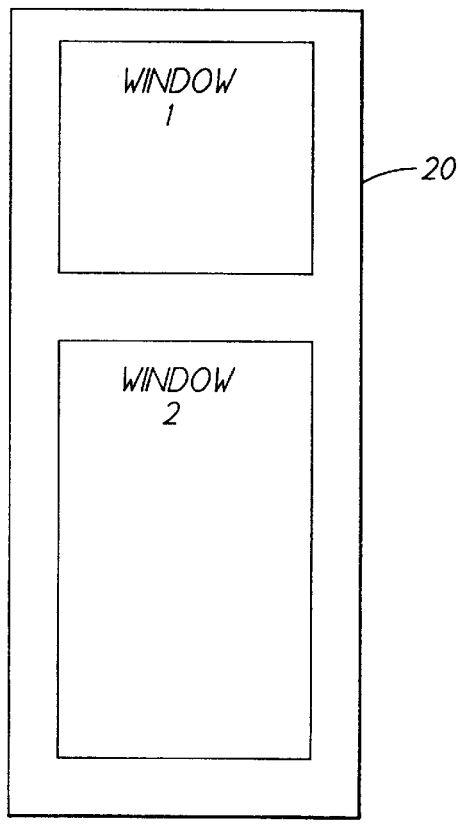
Figure 6C:
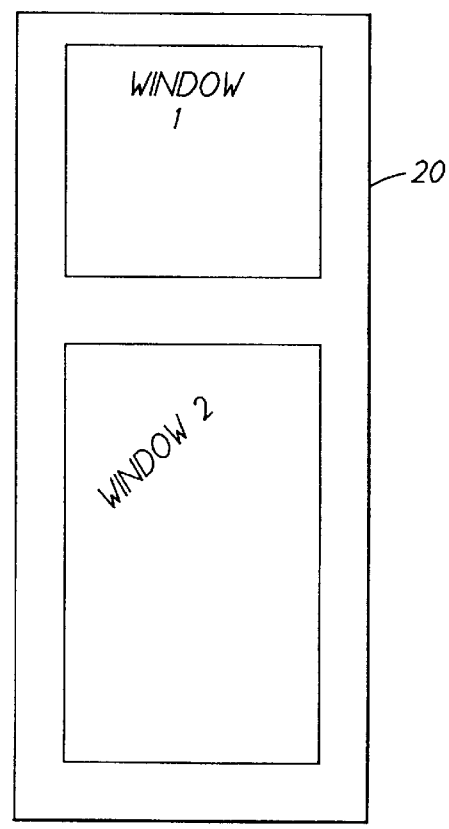

Furthermore, it is within the scope of this invention to partition or window the display 20 so as to provide different display areas. Referring to FIGS. 6A–6C the display 20 is shown with, by example, two windows. In FIG. 6A the lines of characters are displayed so as to run parallel to the long axis of the display 20, in FIG. 6B the lines of characters are displayed so as to run perpendicular to the long axis of the display 20, and in FIG. 6C the lines of characters are displayed so as to run perpendicular to the long axis of the display 20 in Window 1, and to run diagonal to the long axis in Window 2. Not illustrated is the case wherein the lines of characters are displayed so as to run perpendicular to the long axis of the display 20 in Window 1, and to run perpendicular to the long axis in Window 2 (or vice versa). More than two windows can also be displayed.

In this manner information can be displayed to the user in a variety of formats. By example, one or more menu functions can be displayed in one window, and the user's input information displayed in another. In another example, one or more menu functions can be displayed in one window, and a response to a user's query (e.g., display all stored telephone numbers (e.g., office, home, cellular) associated with an inputted name) in another. In another example, received Short Message Service (SMS) messages that are directed to the user could be displayed in one window, while another window is used for displaying a SMS message that is being composed by the user, such as a SMS reply message that is being composed by the user in response to a displayed SMS message from another party.

It is within the scope of this invention to provide windows of fixed size, or of variable size. In the latter case the window sizes may be increased or decreased adaptively as a function of the amount of information that is required to be displayed.

Figure 3A:
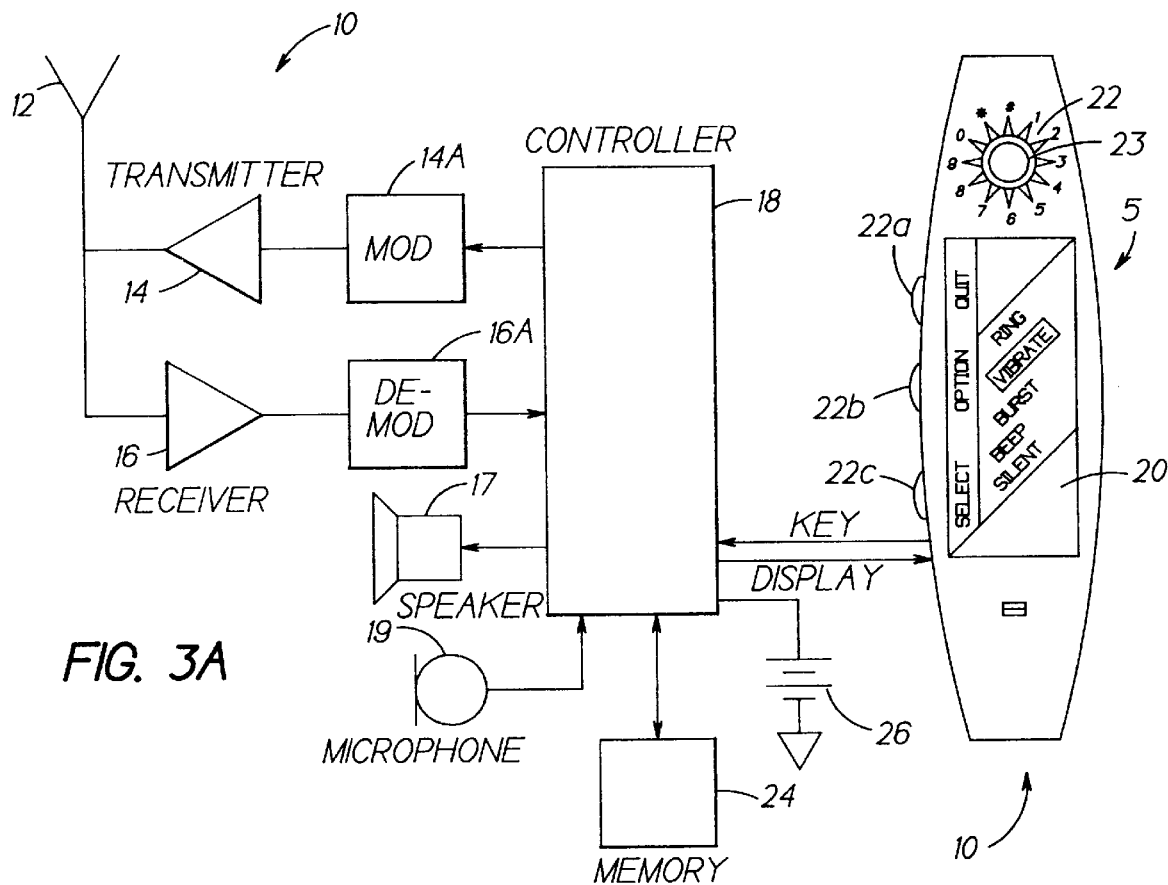
FIG. 3A is a simplified block diagram of a cellular telephone that includes the user interface of this invention.
Figure 3B:
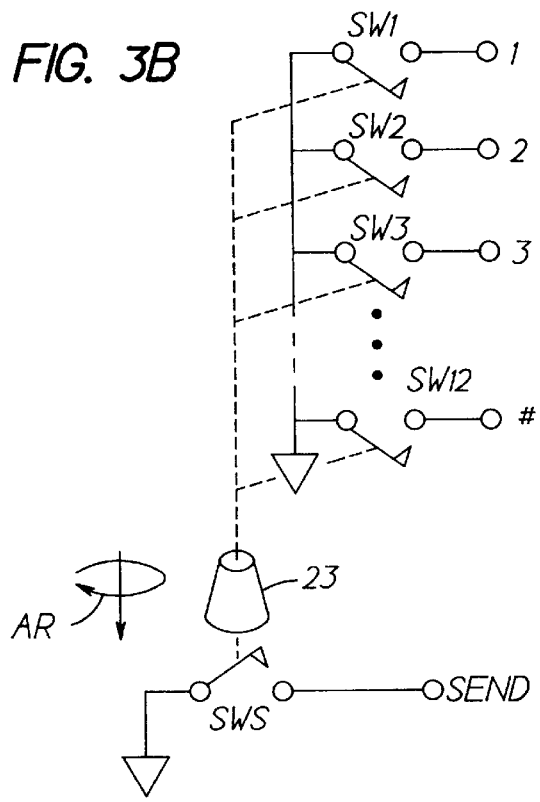
FIG. 3B is a simplified schematic diagram of the manual data input portion of the user interface of this invention.

Reference is now made to FIG. 3A for illustrating a mobile terminal 10, in particular a cellular radiotelephone, that is suitable for practicing this invention. The mobile terminal 10 includes an antenna 12 for transmitting signals to and for receiving signals from a base site or base station (not shown). The base station is a part of a cellular network that may include a Mobile Switching Center (MSC) (not shown). The MSC provides a connection to landline trunks when the mobile terminal 10 is registered with the network.

The mobile terminal 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data.

The mobile terminal 10 includes the conventional speaker 17 and the conventional microphone 19, positioned as shown in FIGS. 1A and 1B.

The mobile terminal 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of controller 18 (and possibly also an LCD controller) is also stored in the memory 24 (typically in a ROM device). The memory 24 may also store data, such as received user messages prior to the display of the messages to the user, and also digits of a telephone number as the digits are selected by a user. The mobile terminal 10 also includes a battery 26 for powering the various circuits that are required to operate the terminal.

The mobile terminal 10 further comprises the user interface 5 constructed in accordance with this invention to have the display 20 and the user input device 22, all of which are coupled to the controller 18. In this embodiment the user input device 22 includes the conventional numeric (0–9) and related indicia (#,*), and the actuator 23 for selecting individual ones of the indicia. Keys 22a–22c may be provided on the side of the mobile terminal 10, and can be used when operating selected ones of the mobile terminal functions (e.g., for selecting the Quit, Option, and Select menu options). It should be noted that when the mobile terminal 10 is held in one hand the user is enabled to manipulate both the actuator 23 and also the keys 22a–22c using, if desired, only the fingers of the hand that holds the terminal.

FIG. 4A illustrates a further embodiment of a mobile terminal 10' in accordance with this invention wherein the actuator 23' has at least two degrees of freedom (FIG. 4B), and wherein the telephone number dialing indicia (i.e., 0–9, # and *) are displayed to the user on the display 20. By manipulating the actuator 23' the user is enabled to reposition a cursor 21 or some other indicator so as to select one of the displayed characters when dialing a telephone number. After positioning the cursor 21 adjacent to one of the displayed characters, some other user action, such as depressing the actuator 23', causes the controller 18 to store the selected character (e.g., the numeric digit 5) as part of a telephone number. When the telephone number is completely specified, some other user action, such as depressing the actuator 23' to a full range of travel, causes a switch closure that is interpreted by the controller 18 as being equivalent to a conventional Send signal (in this regard a separate button could be provided for this purpose). Alternatively, a motion of the actuator 23' in a direction other than that required for selecting a character (e.g., horizontally as opposed to vertically) can be interpreted as a character selected signal and/or as a Send signal. The generation of the Send signal causes the stored digits to be transmitted to the cellular system as a dialed telephone number. The displayed characters can be made to have any arbitrary size (which may be user selectable) so as to facilitate the dialing operation.

FIG. 4C illustrates yet a another embodiment of an actuator 23", in this case a cylindrical actuator having an axis of rotation (AR) about which the user turns the actuator for scrolling the cursor 21 up and down the displayed characters. A depression of the actuator 23" can be used for selecting an indicated character and/or for generating a Send signal.

Figure 5:
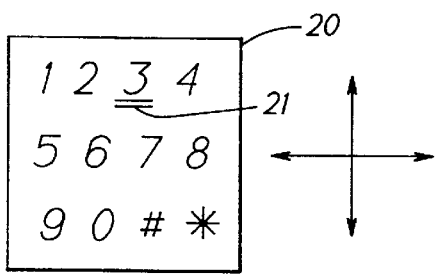
FIG. 5 illustrates a display having numeric digits and other characters arranged in rows and columns as an n×m (i.e., a 3×4) matrix.

In another embodiment (FIG. 4D) a sphere can be employed as the actuator 23''', in a manner similar to that of a conventional computer keyboard trackball. In this case the actuator 23'''can be considered to have a number of axes of rotation. This embodiment can be useful if the displayed characters are arranged in an n×m matrix (e.g., a 3×4 matrix), as is illustrated in FIG. 5, instead of the 12×1 matrix illustrated in FIG. 4A. A depression of the actuator 23''' can be used for selecting an indicated character and/or for generating a Send signal. The multiple degree of freedom (e.g., 4) actuator 23' is also useful for this case, as is the actuator 23 if the surrounding indicia are removed or disregarded.

It should be understood that the mobile terminal 10 can be a vehicle mounted or a handheld device, and can be capable of operating with one or more air interface standards, modulation types, and access types.

While the invention has been particularly shown and described with respect to preferred embodiments thereof, it will be understood by those skilled in the art that changes in form and details may be made therein without departing from the scope and spirit of the invention.

What is claimed is:

1. A handheld radio communications device having a user interface, said user interface comprising:

means for inputting information to said device, said means for inputting extending outwardly from a surface of said device and comprising an actuator having at least 10 degrees of freedom in a plane parallel to said surface for selecting at least individual ones of numeric digits 0 through 9; and means for displaying information to a user of said device, said display means being partitionable into a plurality of windows each of which is capable of displaying at least one text line of alphanumeric characters with an orientation that is neither parallel to a longitudinal axis of said device or perpendicular to the longitudinal axis of said device.

2. A handheld radio communications device as set forth in claim 1, wherein said actuator has a further degree of freedom that is perpendicular to said surface for actuating a switch when depressed.

3. A handheld radio communications device as set forth in claim 1, and further comprising indicia representing said individual ones of numeric digits 0 through 9 in addition to the characters * and #, said indicia surrounding said actuator.

4. A handheld radio communications device as set forth in claim 1, and further comprising indicia representing said individual ones of numeric digits 0 through 9, said indicia being displayed to a user in an n×m matrix format.

5. A handheld radio communications device as set forth in claim 1, and further comprising indicia representing said individual ones of numeric digits 0 through 9 in addition to the characters * and #, said indicia surrounding said actuator and corresponding to a clock face, wherein the indicia "1" corresponds to the 1:00 position, and wherein one of the indicia "*" and "#" corresponds to the 12:00 position.

6. A handheld radio communications device as set forth in claim 1, wherein said actuator is disposed on one of a front surface and a side surface of said device, and further comprising at least one user-depressible switch disposed at least partially on a side surface of said device.

7. A handheld radio communications device as set forth in claim 1, wherein said display means is also disposed on said surface.

8. A handheld radio communications device having a user interface, said user interface comprising:

a display disposed on a surface of said device, said display displaying at least one text line of alphanumeric characters with a non-perpendicular orientation relative to a longitudinal axis of said device, said display being partitionable into a plurality of windows capable of displaying at least one text line of alphanumeric characters with an orientation that is neither parallel to a longitudinal axis of said device or perpendicular to the longitudinal axis of said device.

9. A handheld radio communications device as set forth in claim 8, and further comprising:

means for inputting information to said device, said means for inputting extending from said surface of said device and comprising an actuator having multiple degrees of freedom for selecting at least individual ones of numeric digits 0 through 9.

10. A handheld radio communications device as set forth in claim 9, wherein s aid actuator has a further degree of freedom that is perpendicular to said surface for actuating a switch when depressed.

11. A handheld radio communications device as set forth in claim 9, and further comprising indicia representing said individual ones of numeric digits 0 through 9 in addition to the characters * and #, said indicia surrounding said actuator.

12. A handheld radio communications device as set forth in claim 9, and further comprising indicia representing said individual ones of numeric digits 0 through 9, said indicia being displayed to a user in an n×m matrix format.

13. A handheld radio communications device as set forth in claim 9, and further comprising indicia representing said individual ones of numeric digits 0 through 9 in addition to the characters * and #, said indicia surrounding said actuator and corresponding to a clock face, wherein the indicia "1" corresponds to the 1:00 position, and wherein one of the indicia "*" and "#" corresponds to the 12:00 position.

14. A handheld radio communications device as set forth in claim 9, wherein said actuator is disposed on one of a front surface and a side surface of said device, and further comprising at least one user-depressible switch disposed at least partially on a side surface of said device.

15. A cellular telephone having a user interface, said user interface comprising:

means for inputting information to said cellular telephone, said means for inputting extending outwardly from a surface of said cellular telephone and comprising an actuator having an axis that passes therethrough and that is generally perpendicular to said surface, wherein said actuator has at least 10 degrees of freedom in a plane parallel to said surface for selecting at least individual ones of numeric digits 0 through 9; and means for displaying information to a user of said device, said display means being partitionable into a plurality of windows capable of displaying at least one text line of alphanumeric characters with an orientation that is neither parallel to a longitudinal axis of said device or perpendicular to the longitudinal axis of said device.

16. A cellular telephone as set forth in claim 15, wherein said display means is also disposed on said surface.

17. A cellular telephone as set forth in claim 15, where in said actuator has a degree of freedom that is perpendicular to said surface for actuating at least one switch when depressed.

18. A cellular telephone as set forth in claim 17, wherein a depression of said actuator results in the initiation of a placement of a telephone call to a telephone number previously entered into said cellular telephone.

19. A cellular telephone as set forth in claim 15, and further comprising indicia representing said individual ones of numeric digits 0 through 9 in addition to the characters * and #, said indicia surrounding said actuator.

20. A cellular telephone as set forth in claim 15, and further comprising indicia representing said individual ones of numeric digits 0 through 9 in addition to the characters * and #, said indicia being displayed in an n×m matrix format by said display means.

21. A cellular telephone as set forth in claim 15, and further comprising indicia representing said individual ones of numeric digits 0 through 9 in addition to the characters * and #, said indicia surrounding said actuator and corresponding to a clock face, wherein the indicia "1" corresponds to the 1:00 position, and wherein one of the indicia "*" and "#" corresponds to the 12:00 position.

22. A cellular telephone as set forth in claim 15, and further comprising at least one user-depressible switch disposed at least partially on said surface of said cellular telephone.

23. In a cellular telephone, a method of dialing a telephone number, comprising the steps of:

manipulating a multiple degree of freedom actuator so as to select individual ones of indicia 0–9 that are arrayed about the actuator, the actuator extending outwardly from a surface of the cellular telephone and having at least 10 degrees of freedom in a plane parallel to the surface, each degree of freedom corresponding to one of the indicia 0–9;

storing numbers associated with selected ones of the indicia as individual numbers of a telephone numbers; and displaying information to a user with a cellular telephone display that is partitionable into a plurality of windows capable of displaying at least one text line of alphanumeric characters with an orientation that is neither parallel to a longitudinal axis of said device or perpendicular to the longitudinal axis of said device.

24. In a handheld radiotelephone, a method of dialing a telephone number, comprising the steps of:

displaying at least the numeric digits 0–9 to a user in an n×m matrix format;

manipulating a multiple degree of freedom actuator so as to select individual ones of indicia 0–9 that are arrayed about the actuator, the actuator extending outwardly from a surface of the radiotelephone and having at least 10 degrees of freedom in a plane parallel to the surface, each degree of freedom corresponding to one of the indicia 0–9;

storing selected ones of the numeric digits as individual numbers of a telephone number; and in response to an input from the user, transmitting the stored numeric digits to another location over a radio channel.

25. A wireless personal communicator having a user interface, said user interface comprising:

means for inputting information to said wireless personal communicator, said means for inputting comprising a multiple degree of freedom actuator having individual ones of indicia 0–9 arrayed about said actuator, said actuator extending outwardly from a surface of said personal communicator and having at least 10 degrees of freedom in a plane parallel to the surface, each degree of freedom corresponding to one of the indicia 0–9; and a display, said display being electrically partitionable into a plurality of windows each of which is capable of displaying at least one text line of alphanumeric characters with a selected orientation relative to a longitudinal axis of said wireless personal communicator, the selected orientation including at least one of parallel, perpendicular, and diagonal to the longitudinal axis.

26. A handheld radio communications device having a user interface, said device having a longitudinal axis that passes through opposing first and second sides of said device and a transverse axis passing through opposing third and fourth sides of said device, wherein a distance between said first and second sides is greater than a distance between said third and fourth sides, said user interface comprising:

a display disposed on a surface of said device, said display displaying at least one text line of alphanumeric characters with a non-perpendicular orientation relative to the longitudinal axis of said device, said display being partitionable into a plurality of windows each of which is capable of displaying at least one text line of alphanumeric characters with a parallel orientation relative to the longitudinal axis of said device.

27. A handheld radio communications device having a user interface, said user interface comprising:

a display disposed on a surface of said device, said display displaying at least one text line of alphanumeric characters with a non-perpendicular orientation relative to a longitudinal axis of said device, said display being partitionable into a plurality of windows each of which is capable of displaying at least one text line of alphanumeric characters with a diagonal orientation relative to a longitudinal axis of said device.

\* \* \* \* \*